(12) United States Patent
Zhu et al.

(10) Patent No.: US 10,645,078 B2
(45) Date of Patent: May 5, 2020

(54) SMART CARD THUMB PRINT AUTHENTICATION

(71) Applicant: Microsoft Technology Licensing, LLC, Redmond, WA (US)

(72) Inventors: Liqiang Zhu, Bellevue, WA (US); Joel T. Hendrickson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 15/583,470

(22) Filed: May 1, 2017

(65) Prior Publication Data

US 2018/0316663 A1  Nov. 1, 2018

(51) Int. Cl.
| | |
|---|---|
| *H04L 9/08* | (2006.01) |
| *H04L 29/06* | (2006.01) |
| *H04L 9/32* | (2006.01) |
| *G06F 21/34* | (2013.01) |
| *H04W 12/06* | (2009.01) |

(52) U.S. Cl.
CPC ......... *H04L 63/0853* (2013.01); *G06F 21/34* (2013.01); *H04L 9/0897* (2013.01); *H04L 9/3234* (2013.01); *H04L 9/3236* (2013.01); *H04L 9/3268* (2013.01); *H04L 63/083* (2013.01); *H04L 63/102* (2013.01); *H04L 63/20* (2013.01); *H04W 12/06* (2013.01); *G06F 2221/2141* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 7,392,377 B2 | 6/2008 | Ogg et al. | |
| 8,336,089 B1 | 12/2012 | Ahmed et al. | |
| 8,797,138 B2 | 8/2014 | Myers et al. | |
| 8,868,923 B1 | 10/2014 | Hamlet et al. | |
| 2008/0189554 A1* | 8/2008 | Ali ........................ | G06F 13/10 713/189 |
| 2014/0351586 A1 | 11/2014 | Hook et al. | |

(Continued)

FOREIGN PATENT DOCUMENTS

| | | |
|---|---|---|
| WO | 2001039082 A2 | 5/2001 |
| WO | 2003098398 A2 | 11/2003 |
| WO | 2006028683 A2 | 3/2006 |

OTHER PUBLICATIONS

"Security Configuration Guide", https://www.emc.com/collateral/TechnicalDocument/docu69321.pdf, Published on: Dec. 2016, pp. 1-70.

(Continued)

*Primary Examiner* — Cai Y Chen
(74) *Attorney, Agent, or Firm* — Christopher J. Volkmann; Kelly, Holt & Christenson, PLLC

(57) ABSTRACT

A data center operator is authenticated to obtain requested access to a data center by an approval mechanism on the data center that receives an access request that includes authentication information. The authentication information includes a smart card thumb print which comprises a value that uniquely identifies the smart card based on a private key generated within the smart card. The approval mechanism identifies access policies corresponding to the unique smart card identifier.

20 Claims, 9 Drawing Sheets

(56) References Cited

U.S. PATENT DOCUMENTS

2016/0094546 A1* 3/2016 Innes ................. H04L 63/0823
　　　　　　　　　　　　　　　　　　　　　　713/156

OTHER PUBLICATIONS

"WebNetwork 5.4 Installation and Configuration Guide", https://customer.stone-ware.com/support/techdocs/v5/wn54Install-Config.pdf, Published on: 2009, 3 pages.
"Installation Guide", https://uk.emc.com/collateral/TechnicalDocument/docu59484.pdf, Published on: Jul. 2015, pp. 1-92.
The Ultimate Guide to Office 365, http://web.archive.org/web/20160620142834/http:/networkfish.com/the-ultimate-guide-to-office-365/, Jun. 20, 2016, 36 pages.
"International Search Report and Written Opinion Issued in PCT Application No. PCT/US18/026653", dated Jun. 28, 2018, 13 Pages.

* cited by examiner

SMART CARD THUMB PRINT AUTHENTICATION

BACKGROUND

Computer systems are currently in wide use. Some computer systems include data centers. Data centers can run applications that handle core tasks and procedures and operational data of an organization that is using the data center. Such systems may be proprietary or purchased from a software vendor.

Often the applications or systems running in a data center include multiple hosts, each running a single instance of the application. Some components or applications found in a data center are databases, file servers, application servers, middleware logic, among a wide variety of others.

Some data centers are also used to backup data for an organization. The backup systems can be used in disaster recovery operations or for other operations, and the information can be sent in an encrypted form over a network where it is stored in the data center, or it can be sent in other ways.

Data center operators are often users who have security credentials that can be used to authenticate themselves to a data center, and to perform operations within the data center. The operations may be performed directly on a data center machine, or they may be performed remotely, by obtaining remote access to a data center machine. Some data centers ask for, as authentication information, a password or other personal identification number (PIN), from the data center operator. Other data centers ask for the password or PIN in addition to smart card information on a smart card that is in the possession of the data center operator. The smart card information may include such things as a digital certificate which is issued from a certificate authority within a public key infrastructure (PKI). However, in some scenarios, the certificate authority (which issues, stores and signs digital certificates) can be compromised. This can allow a surreptitious user (or attacker) to print a smart card identifying the surreptitious user as the data center operator. Thus, the surreptitious user may be able to obtain unauthorized access to the data center.

The discussion above is merely provided for general background information and is not intended to be used as an aid in determining the scope of the claimed subject matter.

SUMMARY

A data center operator is authenticated to obtain requested access to a data center by an approval mechanism on the data center that receives an access request that includes authentication information. The authentication information includes a smart card thumb print which comprises a value that uniquely identifies the smart card based on a private key generated within the smart card. The approval mechanism identifies access policies corresponding to the unique smart card identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
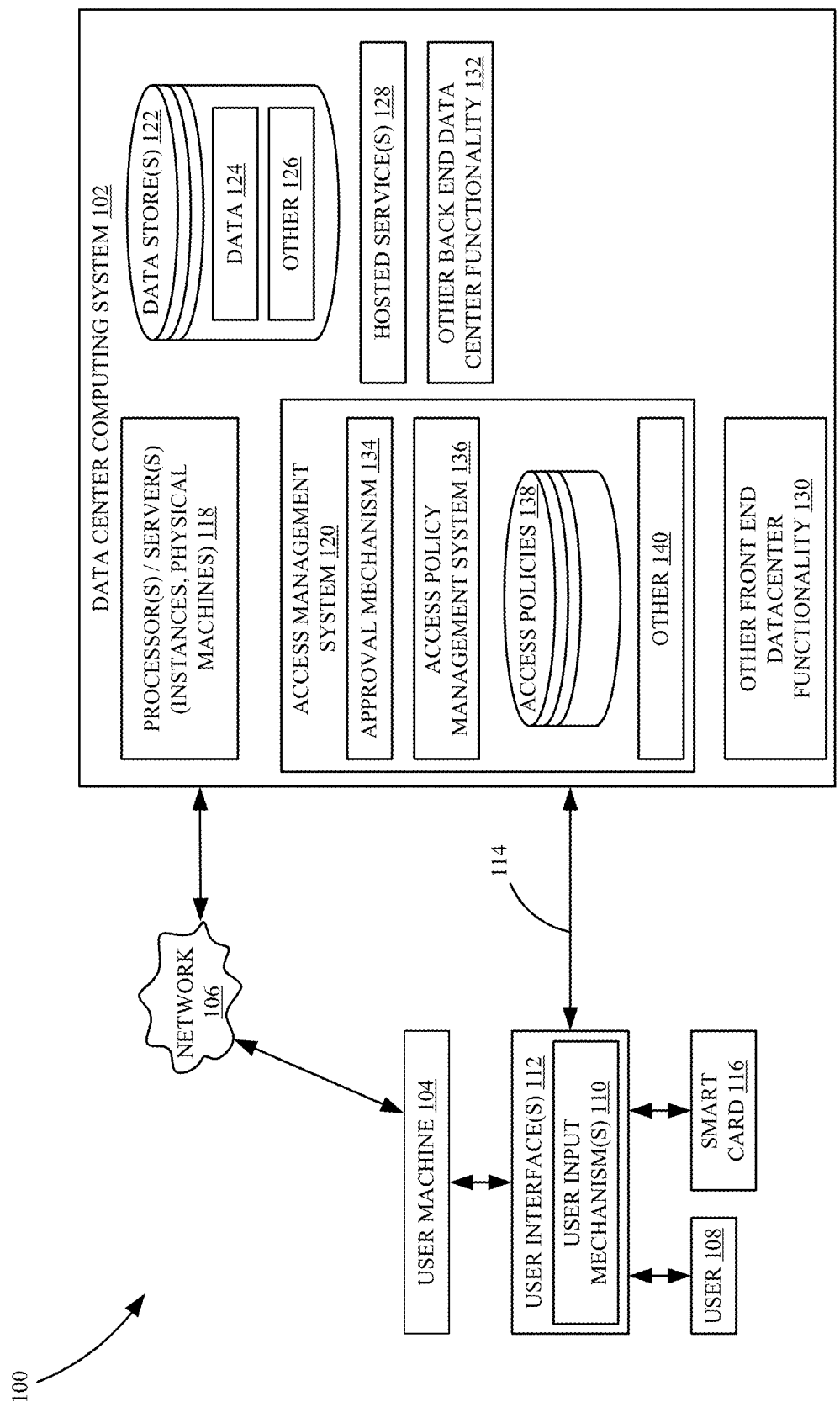
FIG. 1 is a block diagram showing one example of a computing system architecture in which a smart card can be used to access a data center.

FIG. 1 is a block diagram of one example of a computing system architecture 100. Architecture 100 includes data center 102, and user machine 104 that can be connected for communication with one another over network 106. Network 106 can be a local area network, a wide area network, a near field communication network, a cellular network, or any of a wide variety of other networks or combinations of networks.

In the example shown in FIG. 1, user 108 is shown interacting with user input mechanisms 110 on user interfaces 112 to interact with data center computing system 102. In the example shown, user 108 can access data center 102 either directly, as indicated by arrow 114, or through user machine 104. Also, in the example illustrated in FIG. 1, it is assumed that user 108 is an operational user for data center computing system 102, so that, when properly authenticated, user 108 can request and receive access to perform operations within data center computing system 102. For instance, user 108 may interact directly with a machine in data center computing system 102. In another example, user 108 may gain remote access to those machines through user machine 104. Both of these are described in greater detail below with respect to FIGS. 2-4. Also, in one example, user 108 may provide authentication information himself, or herself, as well as through smart card 116.

In the example shown in FIG. 1, data center computing system 102 illustratively includes one or more processors or servers (which can be virtual instances of machines or physical machines) 118, access management system 120, one or more data stores 122 (which can store data 124 and other items 126), one or more hosted services 128, other front end data center functionality 130 and other back end data center functionality 132. Access management system 120 can include approval mechanism 134, access policy management system 136, a data store storing access policies 138, and it can include other items 140. Before describing the overall operation of architecture 100 in more detail, a brief overview of some of the items shown in FIG. 1, and their operation, will first be described.

Front end data center functionality logic 130 illustratively provides a front end, through which users can interact with data center computing system 102. It can include interface generation logic. It can expose application programming interfaces or other interfaces, and it can include other items.

Back end data center functionality 132 illustratively converts the user inputs through front end functionality 130 into instructions to perform operations within data center computing system 102. For instance, it can generate instructions to perform operations with respect to hosted services 128, which may be hosted for various tenants that use data center computing system 102. In doing so, the services 128 may generate, and operate on, data 124 in data store 122.

Some users (such as user 108) may be operational users. Operational users of data center computing system 102 are those users that may be authorized to perform changes to services 128 or other core functions or logic within data center computing system 102. These types of users differ from regular end users of services 128 in that operational users are able to perform data center management operations within data center computing system 102. Thus, they have a relatively high degree of authorized access to data center computing system 102.

In order to gain this type of access to data center computing system 102, user 108 is often asked for multi-factor authentication. For instance, it may be that smart card 116 is associated with a personal identification number (PIN) or other password for user 108. Thus, user 108 may be asked to provide a password or PIN as an authentication input. In addition, smart card 116 may have a digital certificate for which user 108 has registered using a trusted registration authority. The digital certificate may be issued from a certificate authority that is trusted by access management system 120 and data center computing system 102. Therefore, when user 108 inputs his or her password or PIN, and also provides smart card 116 to a smart card reader that reads the authentication information on smart card 116, this information can be used by approval mechanism 134 in authenticating and approving user 108 to have requested data access within data center computing system 102.

Once user 108 is authenticated or approved by approval mechanism 134, access policy management system 136 can obtain the corresponding access policies 138, that correspond to the access level that has been granted to user 108. Access policy management system 136 then determines whether user 108 has requested access that is consistent with the corresponding access policy and, if so, grants user 108 the requested access. If either approval mechanism 104 does not authenticate user 108, or the requested access is not consistent with the access policy, then access management system 120 will deny the requested access.

In the scenario just described with respect to FIG. 1, if a surreptitious user (or attacker) obtains the password of user 108 and the digital certificate of user 108, then the surreptitious user can have a smart card printer print the surreptitious user another smart card and the surreptitious user can use the newly printed smart card to impersonate the identity of user 108 in gaining access to data center computing system 102. Therefore, in accordance with one example, approval mechanism 134 also determines whether user 108 is authenticated based on a thumb print of smart card 116. The thumb print is illustratively a value that changes with each printing of a smart card, and is therefore unique to the particular smart card from which it is read. For instance, in one example, when a smart card is printed, the processing circuitry on smart card 116 generates its own private key which cannot be ordinarily extracted from smart card 116. The thumb print of smart card 116 may be a hash or encrypted value of that private key, and therefore the thumb print will uniquely identify the smart card. When the account for user 108 is setup, that thumb print can be used by access policy management system 136 to correlate the access policies that can be used by user 108, to the smart card thumb print of the smart card issued to user 108. In this way, if a surreptitious user somehow obtains the PIN (or password) and digital certificate for user 108, and has a new smart card printed, the surreptitious user will still be unable to access data center computing system 102, because the thumb print of the newly printed smart card will not match the thumb print of the original smart card which was used by access policy management system 136 to setup the account and correlate access policies 138 to user 108.

Figure 2:
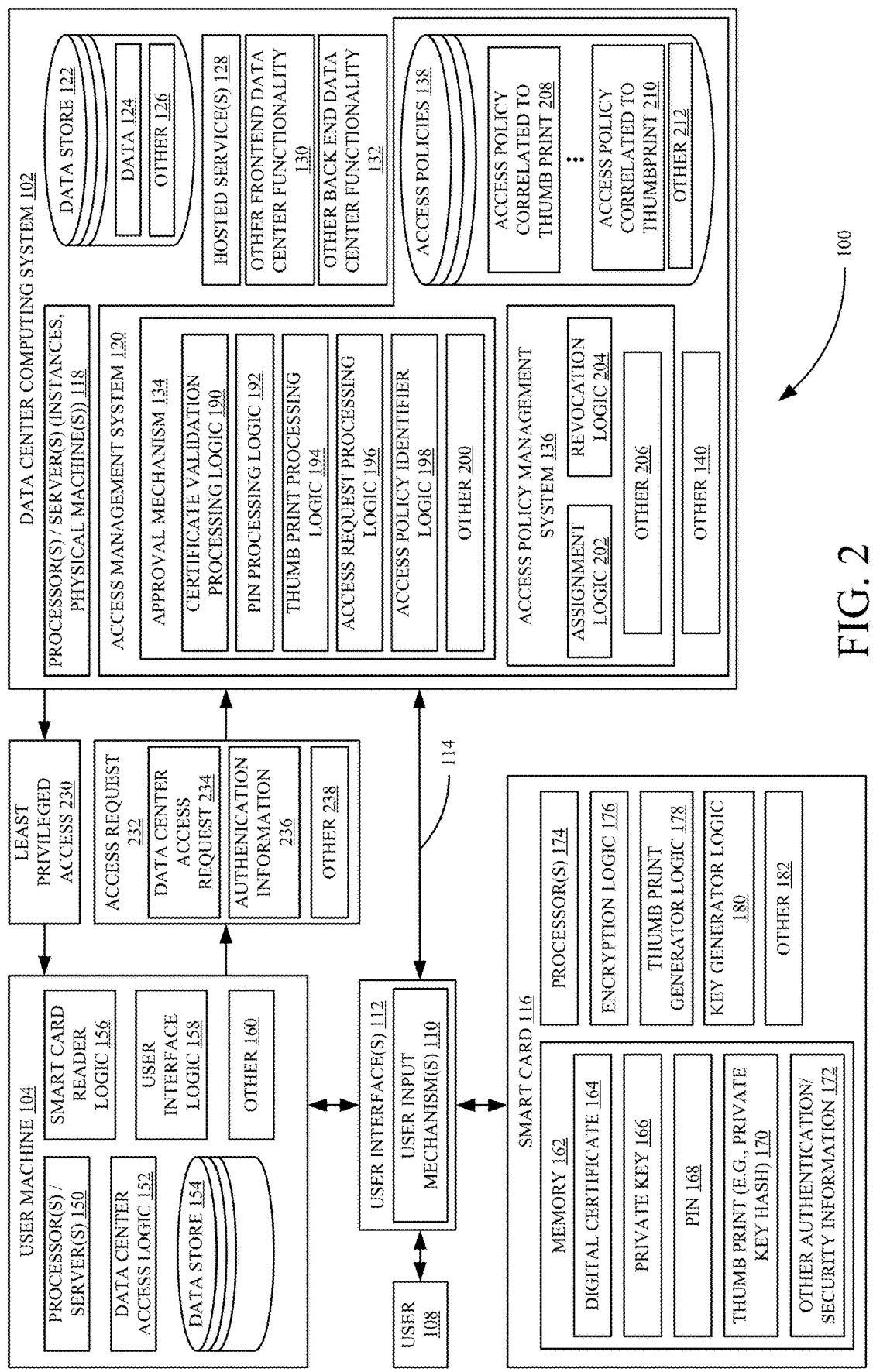
FIG. 2 shows one example of the architecture illustrated in FIG. 1, with certain portions of the architecture shown in more detail.

FIG. 2 therefore shows one example of the block diagram of the architecture shown in FIG. 1, with certain items shown in more detail. FIG. 2 shows that, in one example, user machine 104 can include one or more processors or servers 150, data center access logic 152 (which can be used to communicate with, and obtain access to, data center computing system 102), data store 154, smart card reader logic 156 (which may be a separate smart card reader device, or one integrated into user machine 104), user interface logic 158, and it can include a wide variety of other items 160.

FIG. 2 also shows that, in one example, smart card 116 can include memory 162, that stores digital certificate 164, private key 166, PIN (or password) 168, thumb print 170 (which can be a hash of private key 166 or another value that uniquely identifies smart card 116), and it can include other authentication or security information 172. Also, in the example shown in FIG. 2, smart card 116 includes one or more microprocessors or other processing logic 174, encryption logic 176, thumb print generator logic 178, key generator logic 180, and it can include other items 182. Encryption logic 176 can be run by processor 174 to encrypt various values on smart card 116. Key generator logic 180 can be run to generate private key 166 and/or other information. Thumb print generator logic 178 can be used to generate the thumb print 170 for smart card 116. Again, the thumb print 170 is illustratively a value that uniquely identifies smart card 116. For instance, it can be a hash or encrypted value generated based on private key 166, where private key 166 is not normally extractable from smart card 116, and is generated when smart card 116 is printed (or otherwise created) and uniquely identifies smart card 116.

Also, in the example shown in FIG. 2, approval mechanism 134 illustratively includes certificate validation processing logic 190, PIN (or password) processing logic 192, thumb print processing logic 194, access request processing logic 196, access policy identifier logic 198, and it can include other items 200. Access policy management system 136 can include assignment logic 202, revocation logic 204, and it can include other items 206. The access policies stored in access policy store 138 can include a set of access policies that are each correlated to one or more thumb prints. The access policies are indicated by access policies 208-210 in FIG. 2. Access policy store 138 can include other items 212 as well.

As noted above with respect to FIG. 1, user 108 can access data center computing system 102 directly, or using user machine 104, through network 106. In the example shown in FIG. 2, it is assumed that user 108 is requesting access to data center computing system 102, through user machine 104, by submitting an access request 232, through data center access logic 152. The access request 232 can include a data center access request 234 that identifies particular operations or access that user 108 is requesting to perform within data center computing system 102. Access request 232 also illustratively includes authentication information 236 which serves to authenticate user 108 and validate access request 232. Some of this is described in greater detail below. Access request 232 can include a wide variety of other information 238 as well.

Again, before describing the overall operation of architecture 100 in granting access to user 108, a brief overview of some of the items in access management system 120, and their operation, will first be provided. Assignment logic 202 in access policy management system 136 can illustratively be used to setup an account for user 108. Assignment logic 202 illustratively exposes interfaces that allow an administrative user to assign certain access policies 208-210 to user 108, given the user's identity, given the thumb print of the user's smart card, etc. Revocation logic 204 illustratively allows the administrative user to revoke access by user 108. This may be done, for instance, if user 108 loses his or her smart card 116, changes roles so that user 108 no longer needs the access, or for a wide variety of other reasons. Other logic 206 can be used by system 136 to perform any of a wide variety of management operations. Logic 190 may be part of a validation authority that can be local to data center computing system 102 or remote therefrom.

PIN processing logic 192 illustratively processes the PIN or password information entered by user 108 and read from smart card 116. In one example, logic 192 compares the PIN or password entered by user 108 with that read from smart card 116 (or read from an account corresponding to user 108, or elsewhere) to determine whether they are the same. If so, then PIN processing logic 192 indicates this.

Thumb print processing logic 194 illustratively processes the thumb print 170 read from smart card 116. In one example, the access policies 208-210 are each correlated to a smart card thumb print. Therefore, in such an example, thumb print processing logic 194 can determine whether the thumb print read from smart card 116 is correlated to any access policies 208-210 in store 138. If not, then it will be determined that the access request is coming from a smart card that does not correspond to any access policies, and thus the access request will be denied. In another example, thumb print processing logic 194 illustratively compares the thumb print read from smart card 116 to a maintained list of active thumb prints for which access can be granted. If the thumb print received from smart card 116 is not indicated as being an active valid thumb print, then access will be denied.

Access policy identifier logic 198 illustratively identifies a particular access policy 208-210 that is to be applied to the access request received from user 108. For instance, given the access request and the thumb print received from smart card 116, access policy identifier logic 198 may identify a particular access policy 208-210 that is correlated to the received thumb print. It may also identify access policies 208-210 that are correlated to user 108 in other ways. Access policy identifier logic 198 thus identifies an access policy that is to be applied to the access request received from user 108.

Access request processing logic 196 illustratively determines whether the access request corresponds to the identified access policy. For instance, it may be that the access policy determines that user 108 has access to certain items or functions on data center computing system 102. It may also be that the access request received from user 108 requests a different type of access than is authorized by the identified access policy. In that case, the access request will be denied. However, if the access request is within the access granted by the identified access policy, then access request processing logic 196 grants access to user 108 to perform operations requested in the access request. In one example, the access that is granted is constrained access. For instance, it may be a least privileged access that is needed to perform the operations identified in the access request. Granting least privileged access is indicated by block 230 in FIG. 2. It may also be that the access that is granted has a limited lifetime so that it expires after a certain time period, or is may be constrained in other ways.

Figure 3:
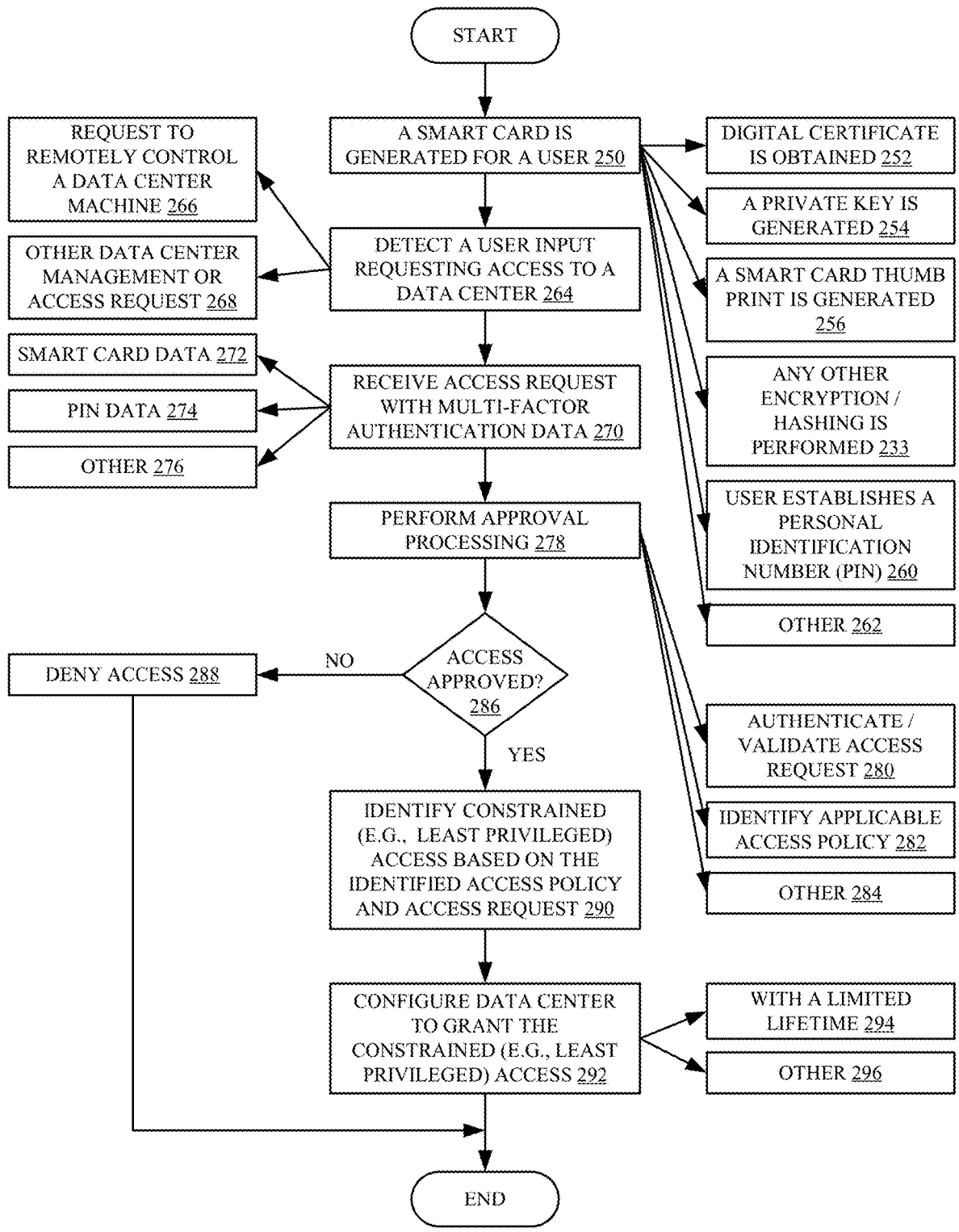
FIG. 3 is a flow diagram illustrating one example of the operation of the architecture shown in FIG. 1 in granting access to a data center operator.

FIG. 3 is a flow diagram illustrating one example of the operation of architecture 100 in receiving an access request 232 from user 108 and authenticating user 108 and validating the access request, to determine whether the requested access should be granted. FIGS. 2 and 3 will now be described in conjunction with another.

It is first assumed that a smart card 116 has been generated (e.g., printed) for user 108. This is indicated by block 250 in the flow diagram of FIG. 3. In one example, generating the smart card 116 will include generating or obtaining a digital certificate 164 that can be stored on smart card 116. This is indicated by block 252, and it can be obtained by having user 108 register with a registration authority and receiving the digital certificate from a certificate authority in a public key infrastructure or another architecture. Generating the smart card 116 can also include generating a private key 166 that is generated and stored on the smart card, itself. This is indicated by block 254. It can include thumb print generation logic 178 generating thumb print 170 for the smart card. Again, this can be a hash or encryption or other representation of the private key 166 that is generated for smart card 116. Generating the thumb print is indicated by block 256 in the flow diagram of FIG. 3. Encryption logic 176 or processor 174 can perform any other type of hashing or encryption functions (such as encrypting digital certificate 164, etc.). This is indicated by block 258.

User 108 will also illustratively establish a personal identification number (PIN) or password that can be stored on smart card 116 or elsewhere. Establishing the PIN or password is indicated by block 260 in the flow diagram of FIG. 3.

The smart card can be generated for user 108 in a wide variety of other ways. This is indicated by block 262.

Access management system 120 then detects a user input requesting access to data center computing system 102. This is indicated by block 264 in the flow diagram of FIG. 3. The request can be a request to remotely control a data center machine in data center computing system 102. This is indicated by block 266. It can be a request to perform any other data center management or access operations as well, and this is indicated by block 268.

Access management system 120 receives the access request 232, along with multi-factor authentication data (although the access request and authentication data can be received separately as well). Receiving the access request and multi-factor authentication data is indicated by block 270. The multi-factor authentication data can include smart card data 272, PIN or password data 274, and it can include a wide variety of different or other data 276.

Approval mechanism 134 then performs approval processing based upon the multi-factor authentication data. This is indicated by block 278. Performing approval processing is described in greater detail below with respect to FIG. 4. Briefly, however, it can involve authenticating or validating the access request 232 and user 108, and it can also involve identifying whether any applicable access policies can be used to process the access request. Approval mechanism 134 can authenticate and validate the access request 232 by authenticating user 108 and validating the access request. This is indicated by block 280. Access policy identifier logic 198 can identify whether any access policies correspond to user 108, given the smart card thumb print or in other ways.

This is indicated by block 282. Performing approval processing can be done in other ways as well, and this is indicated by block 284.

If, the access request is not approved, as indicated by block 286, then access is denied. This is indicated by block 288. For instance, a message may be displayed to user 108 indicating that the access has been denied, indicating why the access was denied, etc.

However, if, at block 286, the access request has been approved, then access request processing logic 196 identifies constrained (e.g., least privileged) access that is needed based upon the identified access policy and the access request 232 that has been received. This is indicated by block 290. For instance, logic 196 can identify a least privileged, isolated access that can be given to user 108, with a limited time span, to perform the requested operations identified in access request 232. This can be done in other ways as well.

Access request processing logic 198 then configures data center computing system 102 to grant the constrained (e.g., least privileged) access to user 108. This is indicated by block 292. Again, as mentioned above, the access can have a limited lifetime as indicated by block 294 and it can be constrained in a wide variety of other ways, as indicated by block 296.

Figure 4:
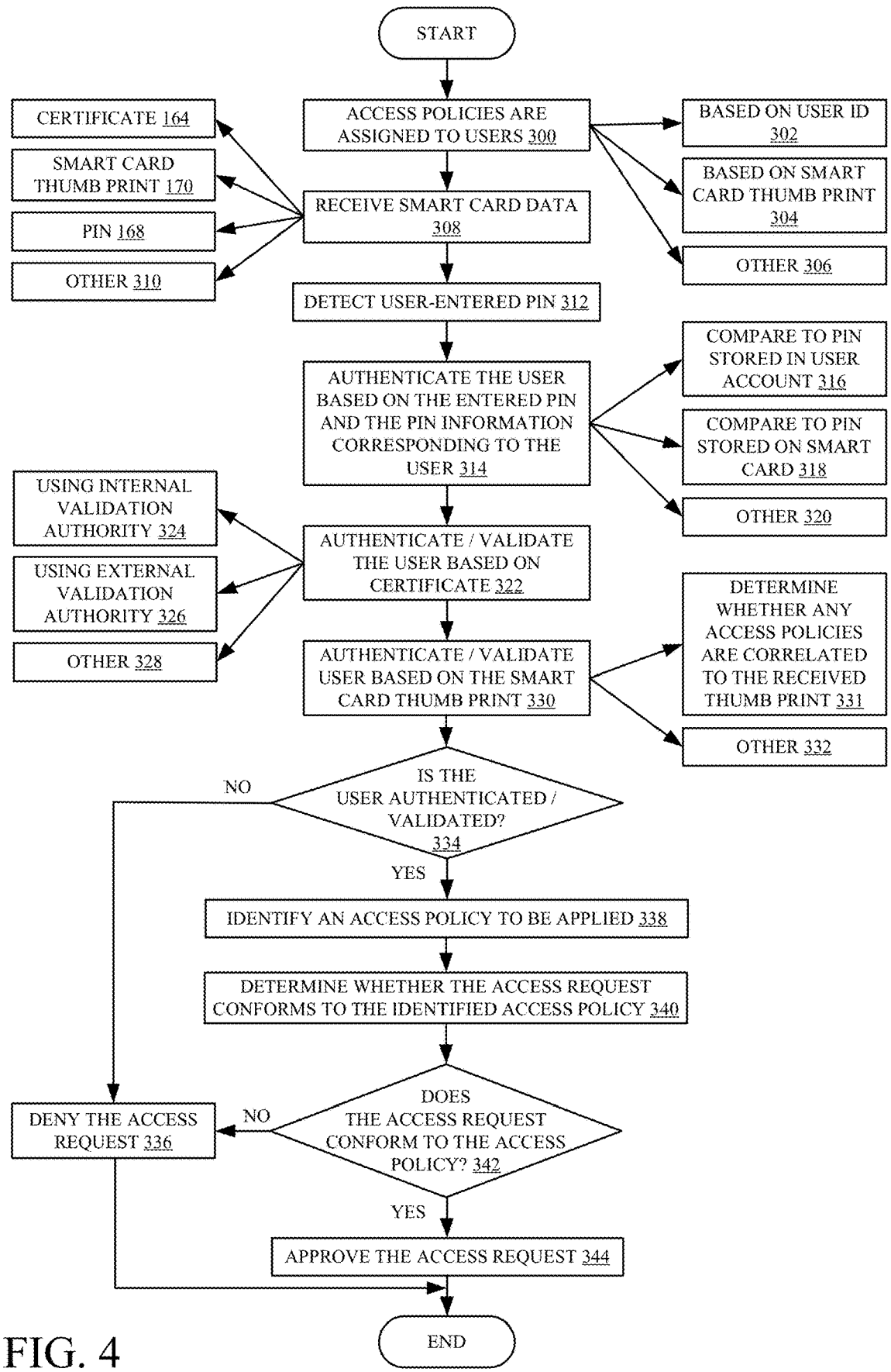
FIG. 4 is a flow diagram illustrating one example of a portion of the operations illustrated in FIG. 3, in more detail.

FIG. 4 is a flow diagram illustrating one example of the operation of architecture 100 in performing approval processing (as indicated at block 278 in FIG. 3) in more detail. It is first assumed that assignment logic 202 has been used to assign access policies to data center management users or operators, such as user 108. This is indicated by block 300 in the flow diagram of FIG. 4. For instance, the access policies 208-210 can be correlated to user 108 based on the user ID as indicated by block 302. They can be correlated to user 108 based on the smart card thumb print. This is indicated by block 304. They can be assigned or otherwise correlated to user 108 or other operational users in other ways as well, and this is indicated by block 306.

Approval mechanism 134 then receives the smart card data (as part of authentication data 236 that is, in turn, part of access request 232). Receiving the smart card data is indicated by block 308 in the flow diagram of FIG. 4. The smart card data can include a wide variety of authentication and validation data. For instance, it can include digital certificate 164. It can include thumb print 170, it can include PIN (or password) data 168 that is read from the smart card, and it can include a wide variety of other information 310.

PIN processing logic 192 can also detect the user-entered PIN or password. This is indicated by block 312. PIN processing logic 192 then authenticates user 108 based on the entered PIN information that was detected by logic 192, and based on the PIN information corresponding to the user. This is indicated by block 314. For instance, it can compare the PIN information entered by the user to PIN or password information stored in a user account. This is indicated by block 316. It can compare the information entered by the user to PIN or password information 168 that is read from smart card 116. This is indicated by block 318. It can authenticate user 108 based on the PIN or password information in other ways as well, and this is indicated by block 320.

Certificate validation processing logic 190 then illustratively authenticates or validates user 108 based on the digital certificate 164 received with access request 232. This is indicated by block 322. For instance, it can do so using an internal validation authority 324, using an external validation authority 326, or in other ways 328.

Thumb print processing logic 194 then authenticates or validates user 108 based upon the smart card thumb print 170 read from smart card 116, and sent with access request 232. This is indicated by block 330. For instance, it can provide the thumb print to access policy identifier logic 198 which can determine whether any of the access policies 208-210 are correlated to the received thumb print 170. This is indicated by block 331. If not, then the access that may have been previously granted to the holder of smart card 116 has been revoked, or smart card 116 is not one which was validly issued and for which access policies have been assigned, etc. Authenticating or validating user 108 based on the smart card thumb print 170 can be done in other ways as well, and this is indicated by block 332.

If the user 108 has not been authenticated or validated, as indicated by block 334, then the access request 232 is denied, as indicated by block 336. However, if, at block 334, the user has been authenticated or validated then access policy identifier logic 198 identifies an access policy 208-210 that is to be applied to the access request 232 to determine whether the data center access request 234 (e.g., the operations or tasks or other access steps that user 108 is asking to perform within data center computing system 102) complies with the access policy. Identifying an access policy to be applied is indicated by block 338 in the flow diagram of FIG. 4.

Access request processing logic 196 then determines whether the data center access request 234 conforms to, or complies with, the identified access policy. This is indicated by block 340 in the flow diagram of FIG. 4. For instance, it can compare the actions or operations which user 108 is requesting to perform within data center computing system 102, to those specified or allowed by the identified access policy to determine whether they are consistent. It can also identify the particular resources or services within data center computing system 102 that user 108 is requesting access to, and determine whether those are consistent with the identified access policy. It can determine whether the access request conforms to the identified access policy in other ways as well.

If the access request does not conform to the identified access policy, as indicated by block 342, then, again, the access request is denied. This is indicated by block 336. If, however, at block 342, access request processing logic 196 determines that the access request conforms to the identified access policy, then the access request is approved and constrained access (e.g., least privileged access) 230 is authorized and configured within data center computing system 102, for user 108. This is indicated by block 344 in the flow diagram of FIG. 4.

It can thus be seen that the present description greatly enhances the security of a data center or other computing system. Not only does it use multi-factor authentication, but it maintains a secure environment, even where an underlying certificate authority in a public key infrastructure is compromised. Thus, even if a surreptitious user obtains a digital certificate corresponding to an authorized user, and has a new smart card printed to emulate the authorized user, the smart card will not work, because the thumb print corresponding to the smart card will not be authenticated by the approval mechanism. Thus, any access request submitted by the surreptitious user will fail, even if the surreptitious user obtains a reprinted smart card under the identity of an authorized user.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
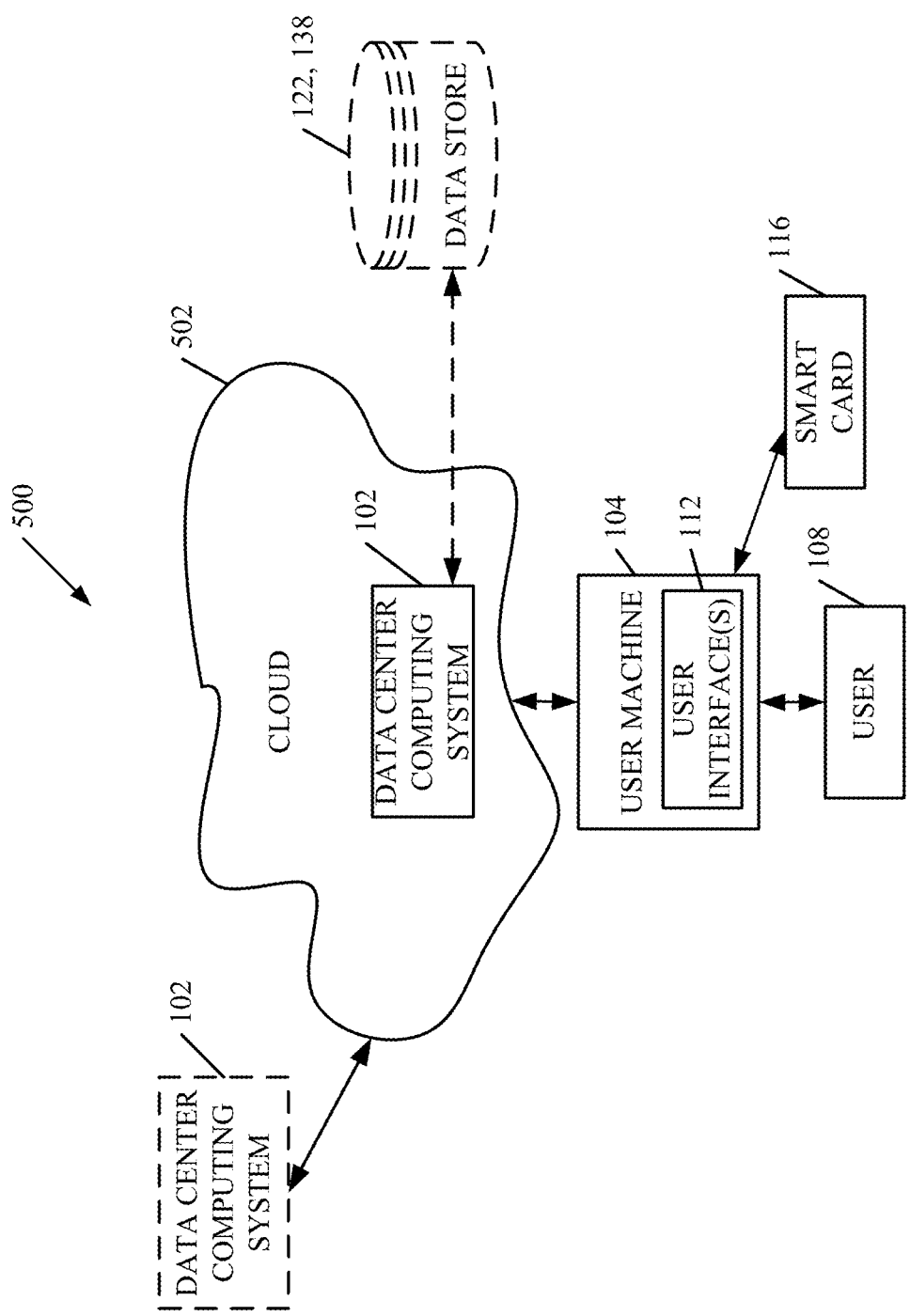
FIG. 5 shows the architecture illustrated in FIGS. 1 and 2, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that data center computing system 102 can be located in cloud 502 (which can be public, private, or a combination where portions are public while others are private). Therefore, user 108 uses a user machine 104 to access those systems through cloud 502.

FIG. 5 also depicts another example of a cloud architecture. FIG. 5 shows that it is also contemplated that some elements of data center 102 can disposed in cloud 502 while others, or the entire data center 102, are not. By way of example, data stores 122, 138 can be disposed outside of cloud 502, and accessed through cloud 502. Regardless of where they are located, they can be accessed directly by machine 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
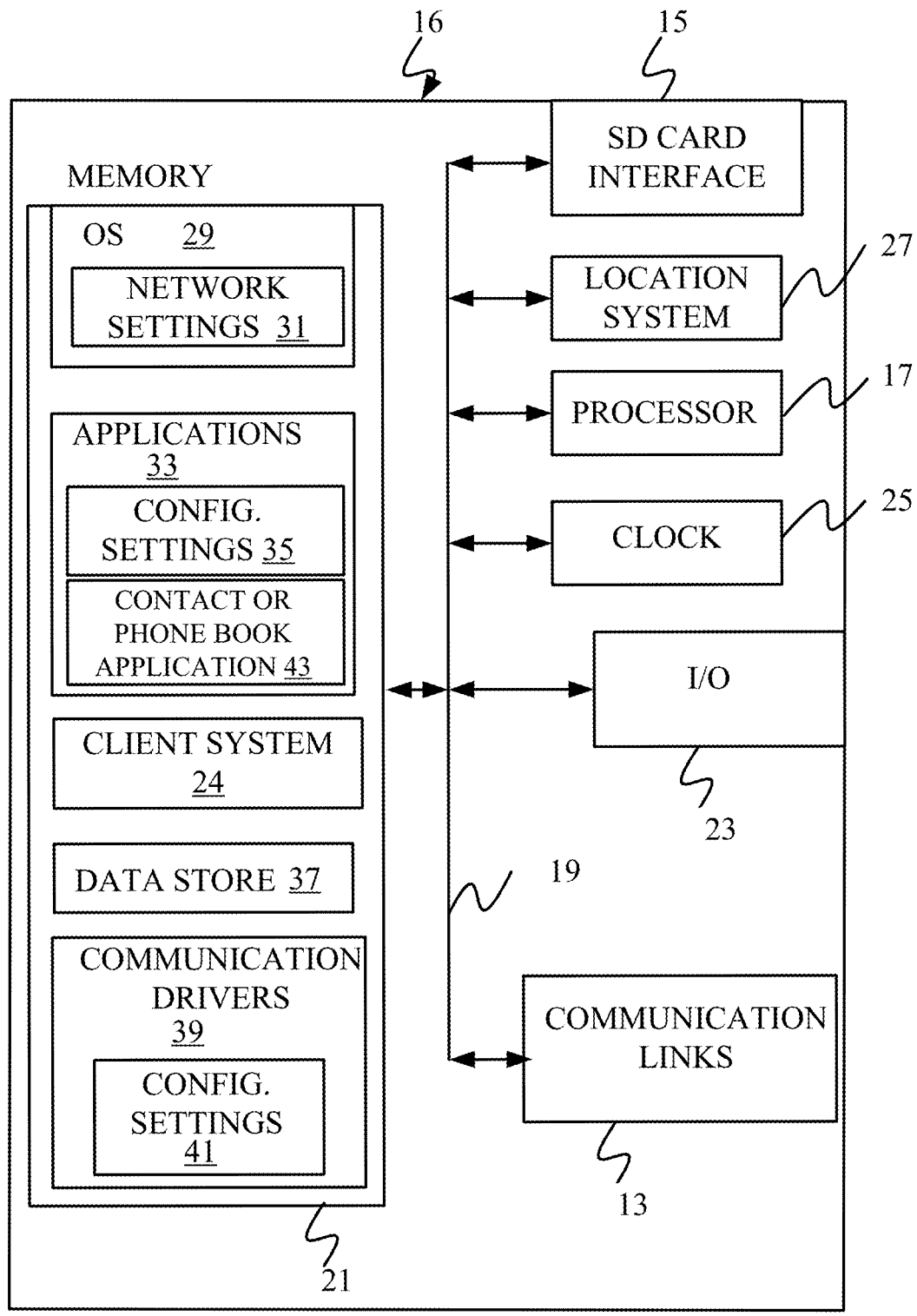
FIGS. 6-8 show examples of mobile devices that can be used in the architectures shown in the previous figures.
Figure 7:
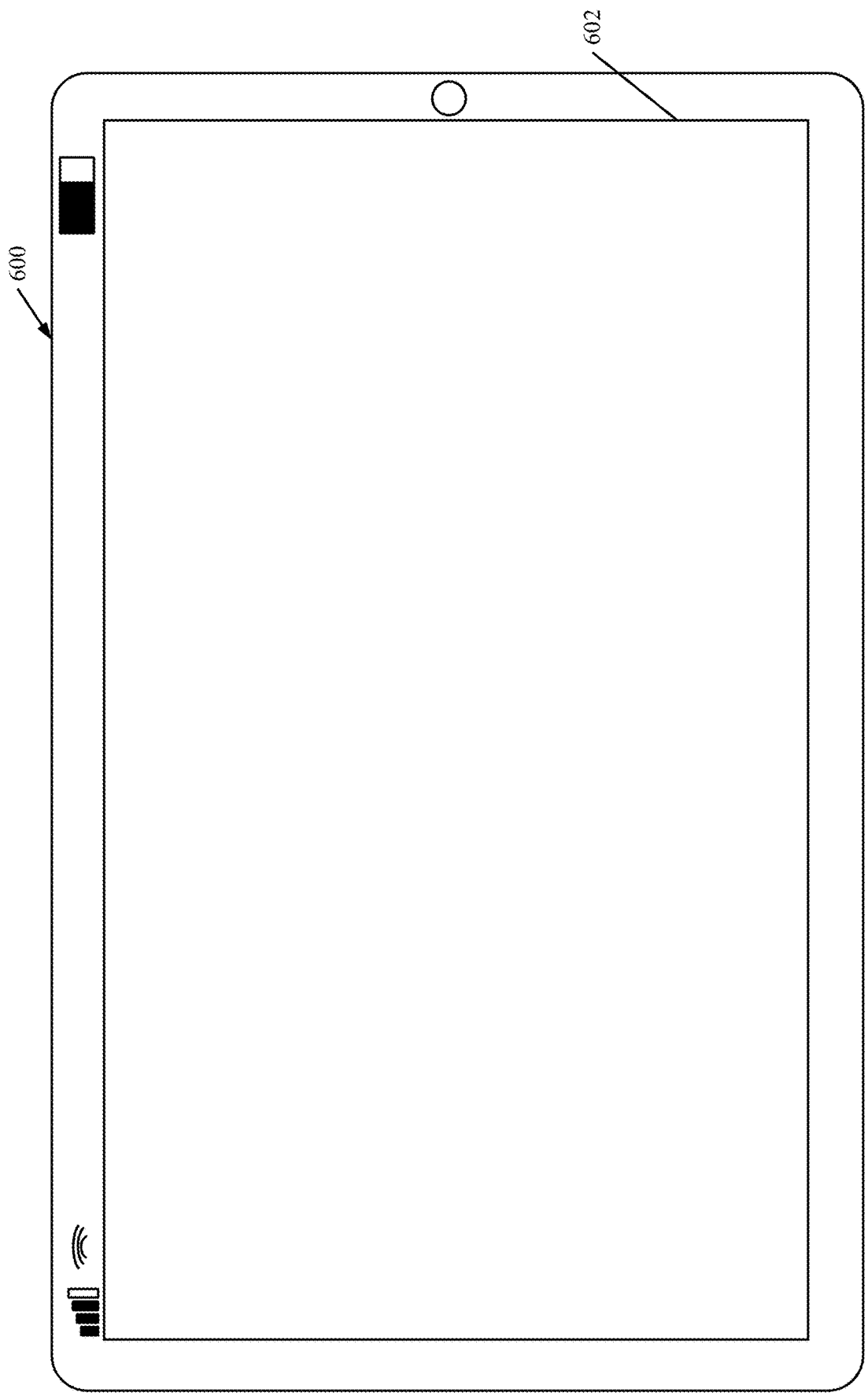
Figure 8:
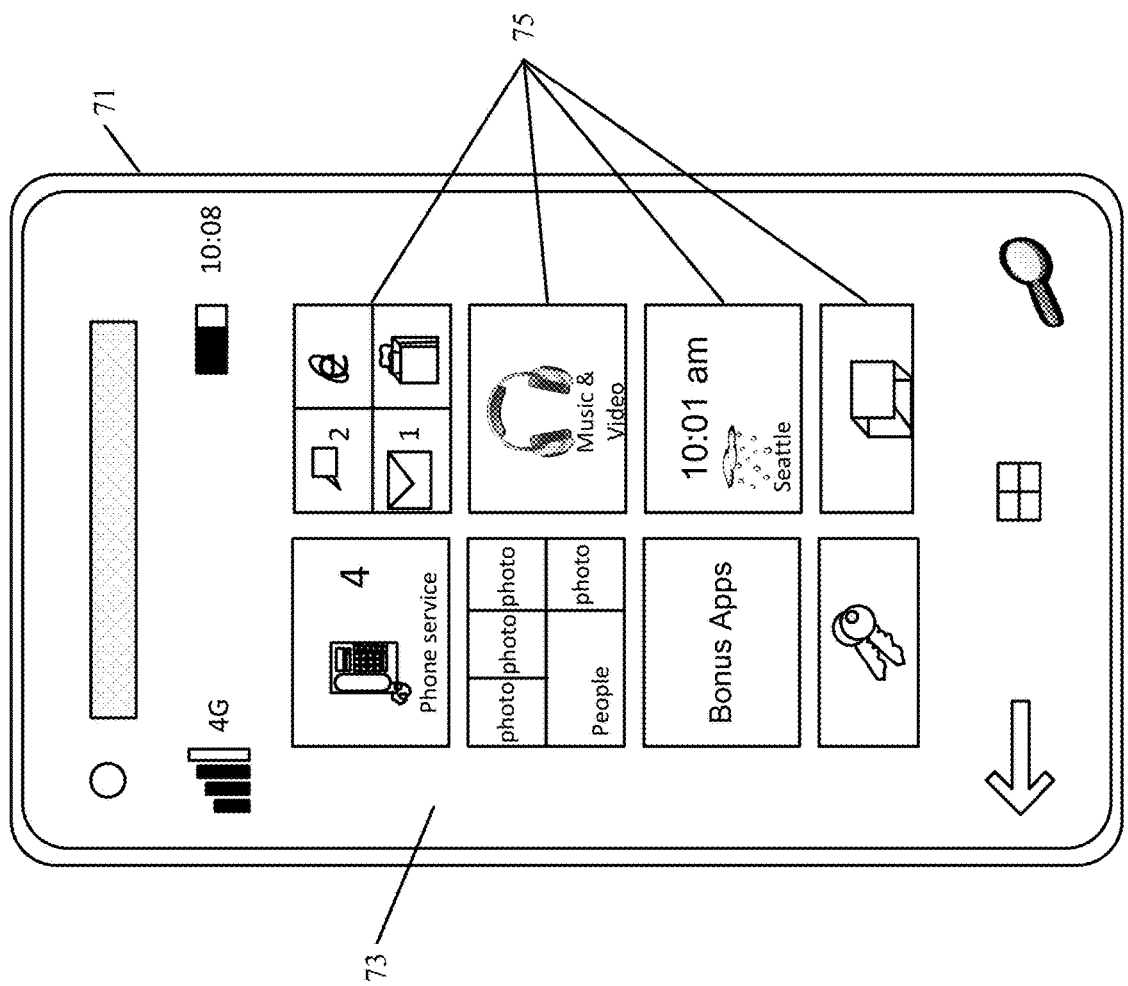

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interact with architecture 100, or both. In the device 16, a communications link 13 is provided that allows the handheld device to communicate with other computing devices and in some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from pervious FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of user machine 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
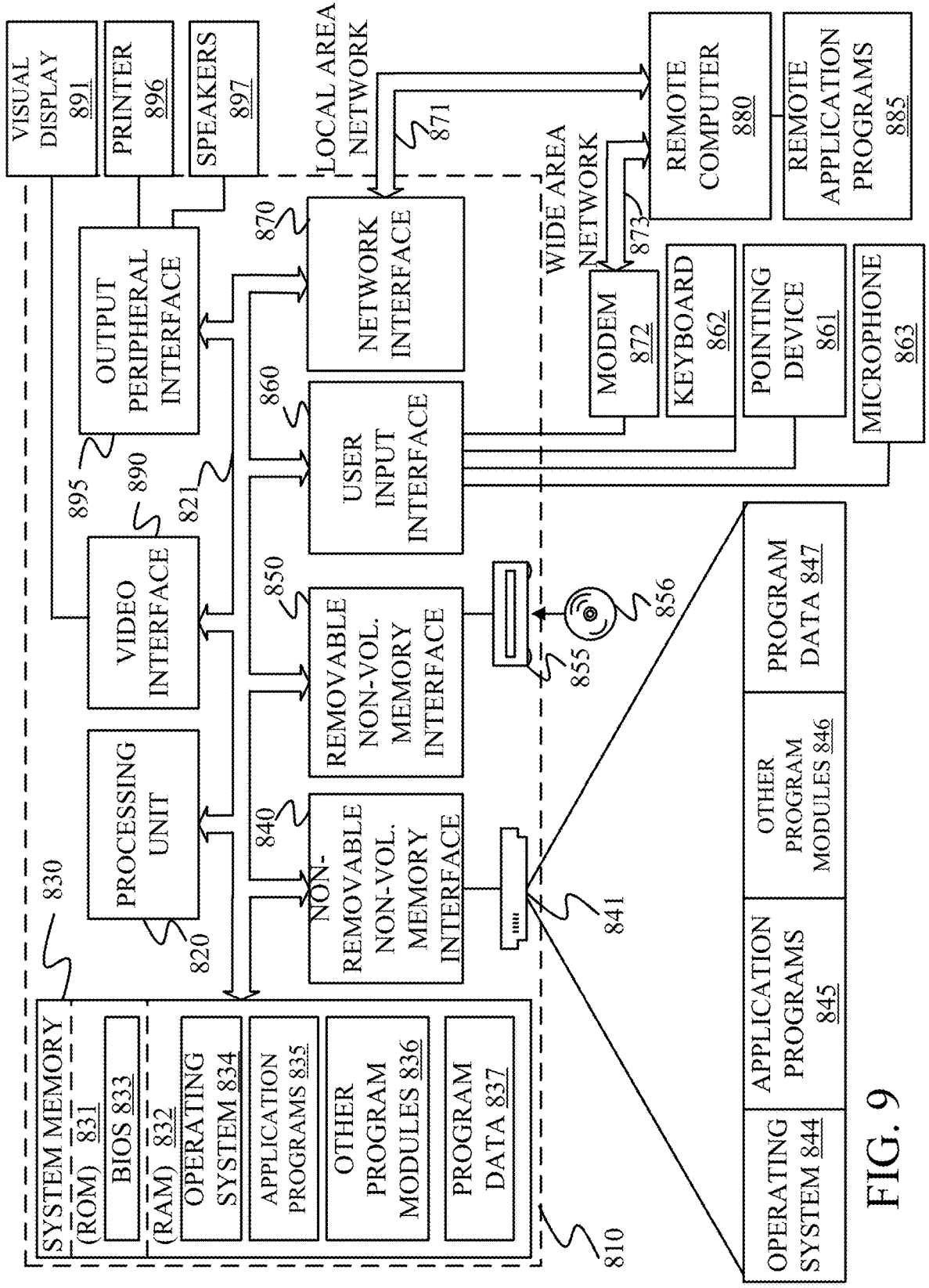
FIG. 9 is a block diagram showing one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a set of data center machines running a data center application; and
an approval mechanism that performs multi-factor authentication relative to an access request requesting access to one of the set of data center machines, the approval mechanism being configured to perform the multi-factor authentication by performing smartcard authentication based on a unique identifier read from a smartcard and corresponding to the access request, the unique identifier uniquely identifying the smartcard.

Example 2 is the computing system of any or all previous examples wherein the approval mechanism comprises:
unique identifier processing logic that authenticates the smartcard based on the unique identifier that includes a representation of a private key generated on the smartcard.

Example 3 is the computing system of any or all previous examples wherein the approval mechanism is configured to receive, as part of the access request, a digital certificate.

Example 4 is the computing system of any or all previous examples wherein the approval mechanism comprises:
certificate validation processing logic configured to validate the digital certificate received with the access request.

Example 5 is the computing system of any or all previous examples wherein the approval mechanism comprises:
access policy identifier logic configured to identify an access policy to be applied to the access request to validate the access request.

Example 6 is the computing system of any or all previous examples and further comprising:
an access policy management system configured to correlate each access policy in a set of access policies to a unique identifier.

Example 7 is the computing system of any or all previous examples wherein the access policy identifier logic is configured to receive the unique identifier from the unique identifier processing logic and identify the access policy to be applied to the access request based on the unique identifier received with the access request.

Example 8 is the computing system of any or all previous examples wherein the approval mechanism further comprises:

access request processing logic configured to apply the identified access policy to the access request to validate the access request by determining whether the access request complies with the identified access policy.

Example 9 is the computing system of any or all previous examples wherein the approval mechanism comprises:

personal identification number (PIN) processing logic configured to receive a PIN or password user input and authenticate the user based on the received PIN or password.

Example 10 is a smartcard, comprising:

key generator logic configured to generate a private key;

memory configured to store the private key;

thumbprint generator logic configured to generate a smartcard thumbprint based on the private key; and a processor configured to provide the smartcard thumbprint as authentication information that uniquely identifies the smartcard.

Example 11 is the smartcard of any or all previous examples wherein the thumbprint generator logic comprises:

a hash value generator configured to generate the smartcard thumbprint as a hash of the private key.

Example 12 is the smartcard of any or all previous examples and further comprising:

encryption logic configured to encrypt a digital certificate and store the encrypted digital certificate in the memory, the processor being configured to provide the encrypted digital certificate as validation information along with a data center access request, to validate the data center access request.

Example 13 is a computer implemented method, comprising:

running a data center application on a set of data center machines;

receiving an access request requesting access to one of the set of data center machines;

receiving a unique identifier from a smartcard and corresponding to the access request, the unique identifier uniquely identifying the smartcard;

performing multi-factor authentication relative to the access request, including smartcard authentication based on the unique identifier.

Example 14 is the computer implemented method of any or all previous examples wherein receiving the unique identifier comprises:

receiving a representation of a private key generated on the smartcard and wherein performing smartcard authentication comprises authenticating the smartcard based on the representation of the private key.

Example 15 is the computer implemented method of any or all previous examples and further comprising:

receiving, as part of the access request, a digital certificate.

Example 16 is the computer implemented method of any or all previous examples and further comprising:

validating the access request by validating the digital certificate received with the access request.

Example 17 is the computer implemented method of any or all previous examples and further comprising:

identifying an access policy to be applied to the access request to validate the access request.

Example 18 is the computer implemented method of any or all previous examples and further comprising:

correlating each access policy in a set of access policies to a unique identifier.

Example 19 is the computer implemented method of any or all previous examples wherein identifying an access policy comprises:

identifying the access policy to be applied to the access request based on the unique identifier received with the access request.

Example 20 is the computer implemented method of any or all previous examples and further comprising:

applying the identified access policy to the access request to validate the access request by determining whether the access request complies with the identified access policy.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data center computing system, comprising:
    a set of data center machines configured to run a data center application; and
    an approval mechanism on the data center computing system and configured to:
        receive an access request indicative of a user requesting access to at least one of the set of data center machines; and
        perform multi-factor authentication relative to the access request, the multi-factor authentication including smartcard authentication that authenticates a smartcard based on a unique identifier read from the smartcard and corresponding to the access request, wherein the unique identifier uniquely identifies the smartcard and is based on a printing cycle that prints the smart card.

2. The data center computing system of claim 1 wherein the approval mechanism comprises:
    unique identifier processing logic configured to authenticate the smartcard based on the unique identifier that includes a representation of a private key that is generated on the smartcard independent of the data center computing system.

3. The data center computing system of claim 1, wherein the access request is received, over a communication network, from a user machine corresponding to the user.

4. The data center computing system of claim 3 wherein the communication network comprises a wide area network, and
    the unique identifier is received by the data center computing system from the user machine.

5. The data center computing system of claim 2 wherein the approval mechanism is configured to receive, as part of the access request, a digital certificate, and the approval mechanism comprises:
    certificate validation processing logic configured to validate the digital certificate received with the access request; and
    access policy identifier logic configured to identify an access policy to be applied to the access request to validate the access request.

6. The data center computing system of claim 5 and further comprising:
    an access policy management system configured to correlate each access policy in a set of access policies to a unique identifier.

7. The data center computing system of claim 6 wherein the access policy identifier logic is configured to receive the unique identifier from the unique identifier processing logic and identify the access policy to be applied to the access request based on the unique identifier received with the access request.

8. The data center computing system of claim 7 wherein the approval mechanism further comprises:
   access request processing logic configured to apply the identified access policy to the access request to validate the access request by determining whether the access request complies with the identified access policy.

9. The data center computing system of claim 2 wherein the approval mechanism comprises:
   personal identification number (PIN) processing logic configured to receive a PIN or password user input and authenticate the user based on the received PIN or password.

10. A smartcard comprising:
    key generator logic configured to generate a private key that is unique to the smartcard;
    memory configured to store the private key;
    thumbprint generator logic configured to generate a smartcard thumbprint based on the private key; and
    a processor configured to:
       generate a data center access request that includes the smartcard thumbprint as authentication information that uniquely identifies the smartcard; and
       send the data center access request to a data center computing system.

11. The smartcard of claim 10 wherein the private key is generated by the key generator logic based on a printing cycle that prints the smart card, and thumbprint generator logic comprises:
    a hash value generator configured to generate the smartcard thumbprint as a hash of the private key.

12. The smartcard of claim 11, wherein the private key is independent of the data center computing system, and further comprising:
    encryption logic configured to encrypt a digital certificate and store the encrypted digital certificate in the memory, the processor being configured to provide the encrypted digital certificate as validation information along with the data center access request, to validate the data center access request.

13. A method performed by a data center computing system, the method comprising:
    running a data center application on a set of data center machines;
    receiving a representation of a smartcard identifier that is generated by a smartcard and uniquely identifies the smartcard;
    identifying an access policy to be applied to an access request, associated with the smartcard, to validate the access request;
    generating a data record that is associated with the smartcard and correlates the access policy to the smartcard identifier;
    receiving the access request requesting access to one of the set of data center machines;
    receiving, from the smartcard, an identifier corresponding to the access request;
    determining that the identifier received from the smartcard corresponds to the smartcard identifier;
    authenticating the smartcard based on determining that the identifier corresponds to the smartcard identifier; and
    based on authenticating the smartcard, processing the access request using the access policy associated with the smartcard.

14. The method of claim 13 wherein receiving the unique identifier comprises:
    receiving a representation of a private key generated by a key generator on the smartcard and wherein performing smartcard authentication comprises authenticating the smartcard based on the representation of the private key.

15. The method of claim 13, wherein the unique identifier is generated based on a printing cycle that prints the smart card.

16. The method of claim 13 and further comprising:
    receiving, as part of the access request, a digital certificate; and
    validating the access request by validating the digital certificate received with the access request.

17. The method of claim 16 and further comprising:
    correlating each access policy in a set of access policies to a unique identifier;
    identifying the access policy to be applied to the access request based on the unique identifier received with the access request; and
    applying the identified access policy to the access request to validate the access request by determining whether the access request complies with the identified access policy.

18. The smartcard of claim 10, wherein the smartcard thumbprint includes a cryptographic value generated by the thumbprint generator logic applying a cryptographic function to the private key.

19. The smartcard of claim 18, wherein the cryptographic function comprises a hash function that generates a cryptographic hash of the private key.

20. The smartcard of claim 18, wherein the cryptographic function comprises an encryption function that generates an encrypted value of the private key.

* * * * *